United States Patent Office 3,442,072
Patented May 6, 1969

3,442,072
DEVICE FOR LOADING AND UNLOADING SPINDLES
Matteo Gillono, 7 Via San Lorenzo, Ivrea, Turin, Italy, and Pietro Alberto, 16 Via Lamarmora, Biella, Vercelli, Italy
Filed Aug. 31, 1964, Ser. No. 393,055
Claims priority, application Italy, Sept. 4, 1963, 18,126/63; Aug. 18, 1964, 17,948/64
Int. Cl. D01h 9/10
U.S. Cl. 57—53                                    25 Claims

ABSTRACT OF THE DISCLOSURE

A device is provided for the loading and unloading of bobbins onto the spindles of spinning and doubling machines. The device is provided with pincers which are mounted to engage the bobbins and to move the bobbins in a horizontal plane as well as in a vertical plane. The pincers are mounted on a carriage which slides along a row of spindles.

---

This invention concerns a universal automatic device for loading and unloading spindles on spinning or doubling machines for fibers in general and, especially, for removing the full bobbin from such machines, replacing it by an empty one on each spindle.

In the case of spinning or doubling machines it is well known that, at the end of each spindle cycle full bobbins are replaced by empty ones, which operation is usually carried out by hand. This operation has to be repeated several times during the day. Consequently, it is necessary for several workers to be employed each time and, as the number of spindles on each machine is considerable, being sometime as high as several hundred, the machine has to be kept at a standstill until the operation of changing the bobbins on the spindles has been accomplished. Employment of one or more workers and the idle time of such machines however considerably increase the cost of the final product.

In order to eliminate this trouble, it has been planned to construct a movable, automatic device capable of carrying out the aforesaid operation on any type of spinning or doubling unit, which device can be moved from one machine to another.

The device, according to this invention, is composed of a support which slides, by means of a carriage, on a rail fitted on the machine headstock (this being the only modification to be made to extant machinery for fitting the device in question).

Movement of the aforesaid support together with the carriage and movement of its components can be effected pneumatically, hydraulically or electrically.

In a first embodiment the carriage stroke is adjusted and limited according to distance between centers of machine spindles, by means of a positioning cylinder which moves in housings planned on the rail at equal distances to that of the distance between spindle centers and which, further, causes the carriage to move forwards when the positioning cylinder is engaged in a housing, while also moving forward with its plunger when the abovementioned positioning cylinder is released.

The support of the device is adjustable as to height according to the position and dimension of the spindles. The support comprises two vertical cylinders which cause one or more couples of arms fitted with movable pincers which seize and release bobbins, to rotate around an axis of 180°, in such a way as to bring the arms into position on the machine or on the feed side of device. Of each couple of arms, one removes the full bobbins while the other places fresh empty bobbins on the machine. Pincers appertaining to each couple are operated in alternate synchronism, viz. when one opens, the other closes, and vice versa, by means of two further cylinders which allow seizing or releasing of the bobbins by the pincers.

Further, the support effects a downward translation movement when the arms are rotating towards the machine and effects an opposite upwards translation movement when the arms rotate in the opposite direction, such vertical translation movements being controlled by a further cylinder. The aforesaid movements are adjustable as to stroke according to the length of the spindles.

A mechanism is planned to vary the distance of the pincers according to the extant distance between centers of the spindles of the machine to which the device is to be fitted. The operation of the positioning cylinder and that of the cylinders controlling the rotation of the arms is effected by means of micro-contacts fitted at preset distances on the carriage and rail.

A loader of empty bobbins is used which is composed of a box which acts as a store containing bobbins aligned in advance and made in such a way as to prevent only one bobbin at a time to the loading arm.

The arms could also effect a movement other than that of rotation around an axis on a vertical plane and could rotate on various planes or carry out movements other than that of rotation.

Vertical translation movements of the support occur during rotation of the arms, i.e. downward movement during the end of rotation of the arms towards the machine and upward movement at the start of rotation of the arms in the opposite direction.

Although operation of the device by completely mechanical or electromechanical means might be considered, a pneumatic, hydraulic or oil hydraulic system appears to be the most advisable with regard to safety and automatism of movements.

All strokes and reciprocal distances of the several components can, obviously, be adjusted in such a way as to allow operation of the device on any type of spinning or doubling machine, without requiring any modification so that the device can be quickly transferred from one machine to another, thus making the device completely universal.

A second embodiment comprises modifications and improvements in comparison to the first embodiment and these modifications and improvements allow of reducing overall measurements of the device and of a more exact operation with the use of a lower number of hydropneumatic and mechanical components.

More particularly, rotation movement of the arms carrying the pincers for seizing bobbins has been reduced to only 90° and is controlled by means of a suitable shaped cam or race; the bobbin seizing pincers are articulated in such a way as to be completely jointed and independent of the support arms; they are capable of seizing accurately either empty or full bobbins whatever the volume of thread wound may be; forward movement of device on the rail is effected by means of a different mechanism coupled to a continuous supply of compressed air for operation of the various components of the device; finally adaptation of the device to any type of spinning or doubling machine is made more exact by means of further adjustment points of several components.

According to the second embodiment it will be necessary to add, besides a rail for forward movement of the device, tubing for compressed air, running along the whole length of the machine in the same way as the rail. Also, the tubing has to be fitted with replenishment points for the device, which points are disposed at regular intervals.

The advantages and characteristics of the invention will be better understood by making reference to the following detailed description and accompanying drawings, in which.

Figure 1:
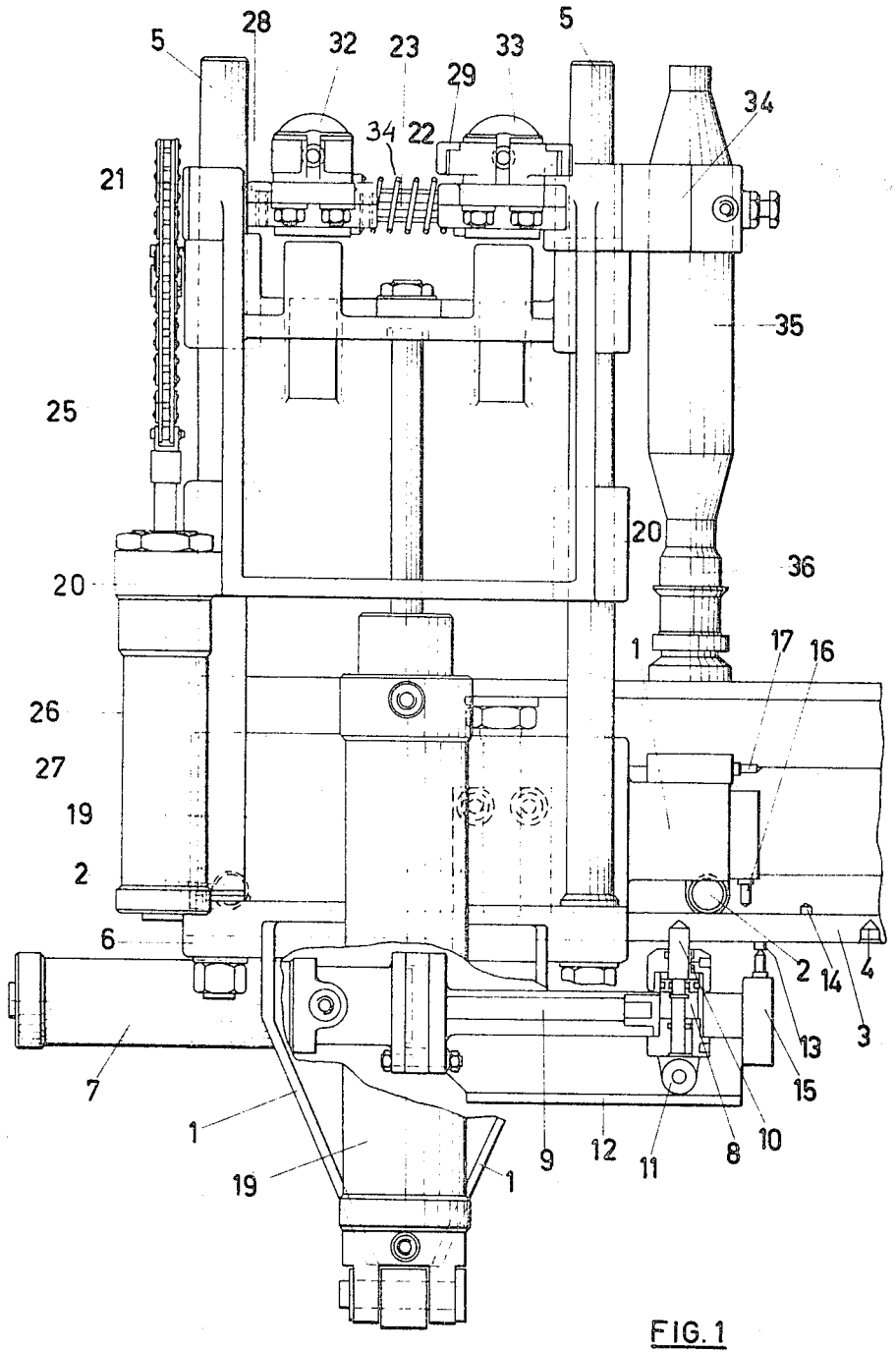
FIG. 1 is a front view of the first embodiment of device according to this invention, at the start of a stroke position.
Figure 2:
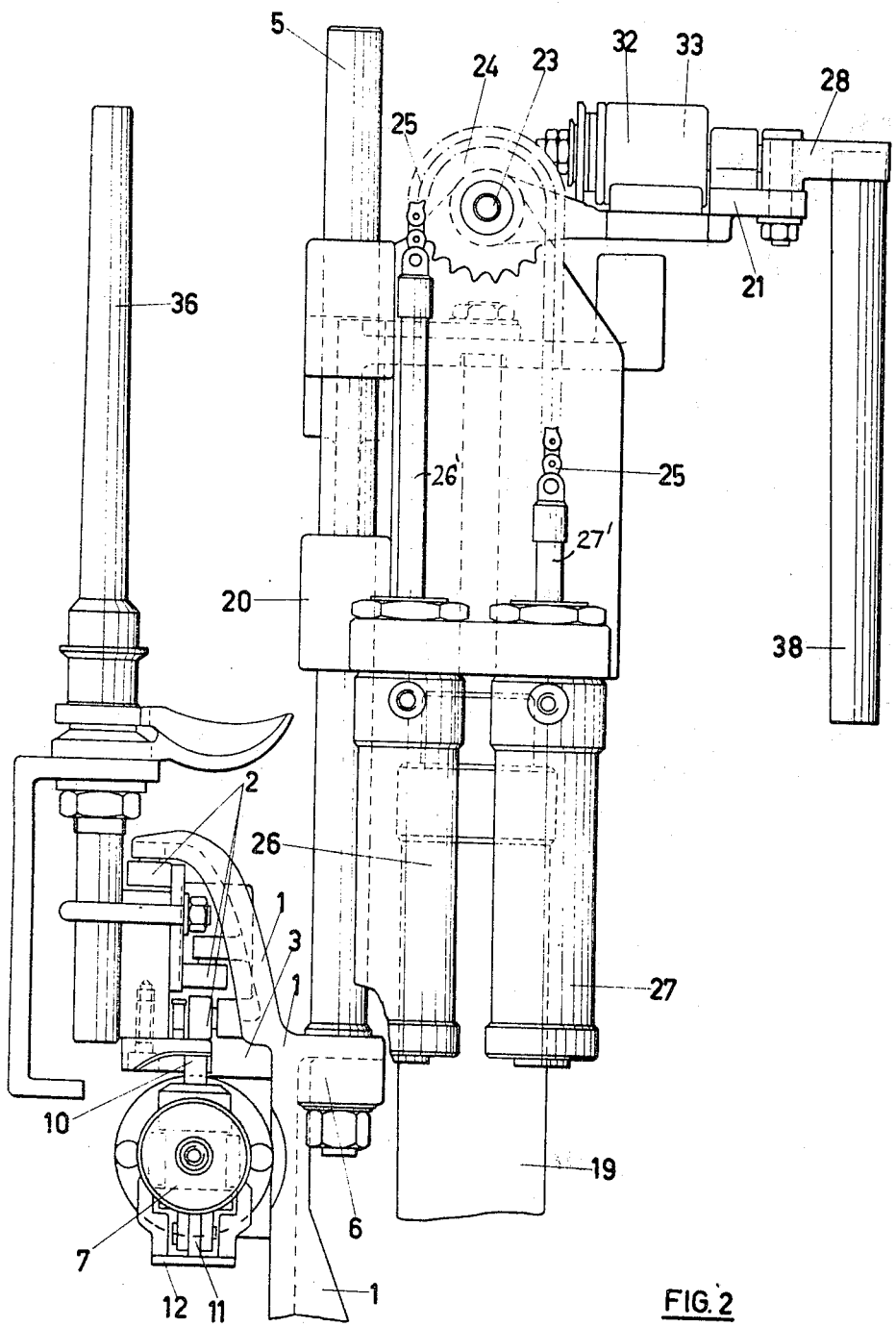
FIG. 2 is a side view of the same device, but following a first rotation.
Figure 3:
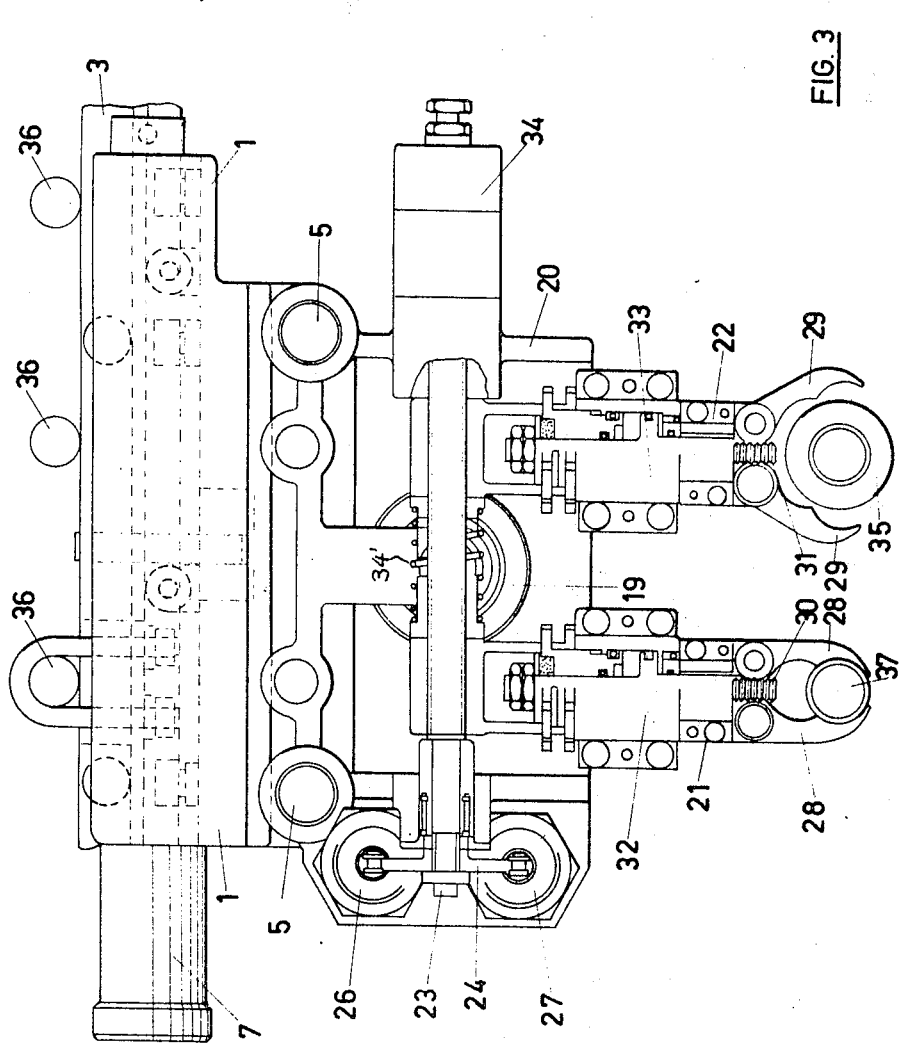
FIG. 3 is a top view of the device as illustrated in FIG. 2.
Figure 4:
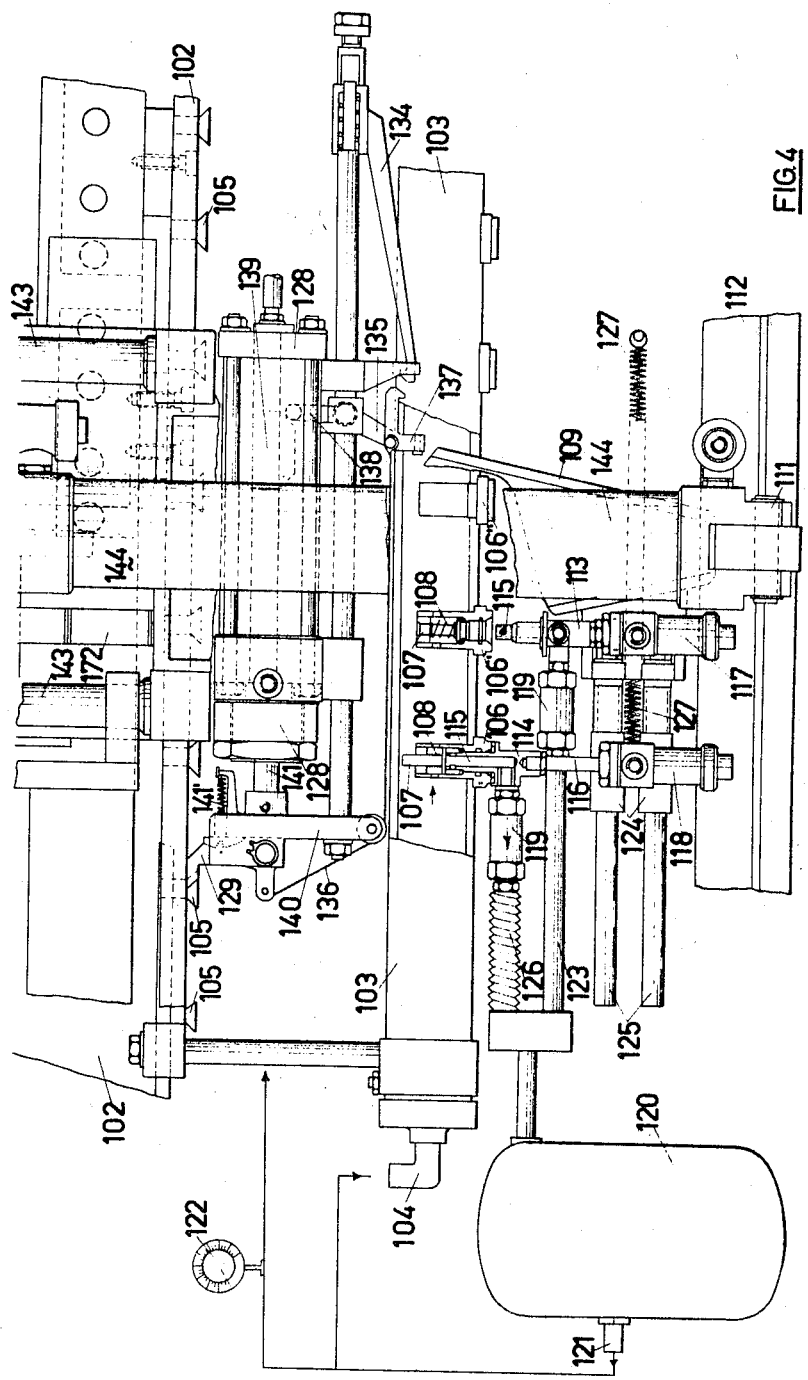
FIG. 4 is a front view of lower part of the second embodiment of the invention, comprising feed components as well as advance and raising components.

Referring first to FIGS. 1 to 3, the device is composed of a carriage 1 which slides by means of rollers or wheels 2 on a rail 3 fitted with housings 4, arranged at intervals equal to those of the spindles and fitted on a machine (such as not shown in figure). Two columns 5 which support the device are solid with the carriage 1 and are fitted on the aforesaid carriage.

A pneumatic or hydraulic cylinder 7 is fitted under carriage 1 for horizontal movement of the device and another cylinder 8 for positioning the device is fitted at the end of plunger 9 of cylinder 7, said cylinder 8 controlling a rod 10 which can engage the housings 3 planned in rail 3; a small wheel 11 running on lower part 12 of the carriage is fitted on the aforesaid cylinder 8.

Microcontacts 13 and 14 are fitted on rail 3, the first being operated by a microswitch 15 and the second by a microswitch 16 planned on carriage 1 and also by an end of stroke switch 17.

Further, a vertical cylinder 19 is fitted on carriage 1 for vertical translation of a support 20 which carries a couple of arms 21 and 22 rotating around an axis 23 by means of a toothed wheel 24 and a chain 25 operated in one direction by the vertical cylinder 26 and in the other by the vertical cylinder 27. The chain 25 overlies the toothed wheel 24 in meshing engagement and is secured at each end to a piston 26', 27' of each respective vertical cylinder 26, 27 (FIG. 2) so that upon vertical movement of these pistons the chain 25 is pulled around the toothed wheel axis to cause rotation of toothed wheel 24. Arms 21 and 22 are both fitted at their ends with pincers 28 and 29, respectively, controlled by springs 30 and 31 fitted on the piston rod of cylinders 32 and 33. Each pincer 28, 29 is independently articulated for complete jointing so as to be independent of movable supports.

Cylinders 32 and 33 control the opening and closing movement as well as the alternate synchronism of pincers 28 and 29, i.e., when one is open, the other is closed and vice versa. When cylinder 26 causes arms 21 and 22 to rotate in a given direction, cylinder 27 acts as a brake and vice versa.

The two arms 21 and 22 can be detached or approached to each other according to the distance between centers of spindles, by means of a pneumatic mechanical mechanism 34. The pneumatic mechanism 34 is adapted to urge the arm 22 toward arm 21 against the force of spring 34' (FIGS. 1 and 3) or to move away from arm 22 to permit the spring 34' to urge the arms 21, 22 apart.

FIG. 1 shows a full bobbin 35 on spindle 36 of the machine; in FIG. 2 there is shown an empty bobbin 38 and an empty spindle 36, the empty bobbin being seized by pincers 28; and FIG. 3 shows pincers 29 unloading a full bobbin 35.

Operation of the device according to the invention is simple, automatic and quick, as replacement of a full bobbin by an empty one can be effected in about one second.

According to the machine characteristics the following easy adjustments can be made: (a) Appropriate position of arms 21 and 22 on the basis of the distance between centers of spindles by means of mechanism 34, and (b) Adjustment of the raising of vertical cylinder 19 by means of a rod (not shown in the drawings) bearing fixed adjustment pointers corresponding to the movable length of bobbins in use.

The device at the start of each operational cycle is placed as shown in FIG. 1, i.e., backwards in respect of the first spindle of the machine. When the device has been started by means of any suitable control which is not shown, microswitch 15 comes into contact with microcontact 13 and, therefore, cylinder 8 causes rod 10 to enter the first housing 4 of rail 3. Plunger 9 then starts to return into cylinder 7 (feed cylinder) and the whole being locked by rod 10 on rail 3, movement of plunger 9 compels the whole of the device anchored on sliding support 1 to move to the preset extent from the distance between centers. Naturally, this locking and unlocking in the notch could also be easily obtained by means of a mechanical or electromechanical system or by electromagnetic means.

During translation, the carriage head with microswitch 16 meets microcontact 14 fitted at a suitable distance from start and this contact causes the piston 26' in cylinder 26, which causes arms 21 and 22 to rotate towards the machine, to start moving; after about 120° of rotation the arms meet a contact (not shown) which causes vertical cylinder 19 to operate. This cylinder causes support 20 to drop together with arms 21 and 22 and pincers 28 and 29 while feed stroke of feed cylinder 7 is completed; pincers 29 which are open, drop around the first bobbin 35 which is full and at the end of the drop another contact (not shown) operates cylinders 32 and 33 which cause respectively opening of pincers 28 (not illustrated during this first cycle) and closing of pincers 29 which thus seize the first full bobbin 35 of the machine.

At the same time, rod 10 is pulled out of housing 4 and plunger 9 in the expansion phase moves forward until it reaches positioner microswitch 15 which comes in contact with the next microcontact 13 thus causing operation of small cylinder 8 which causes rod 10 to enter the next housing 4 of rail 3.

At the same time, movement of vertical cylinder 19 is inverted and this causes the whole unit of support 20 to rise and, at the end of the stroke, cylinder 27 enters into action causing arms 21 and 22 to rotate in the opposite direction, i.e., taking them further away from the machine, while pincers 29 which are closed carry away the full bobbin 35.

Following rotation through 180° the arms meet a contact (not shown) which again operates cylinders 32 and 33; these cylinders reverse the position of the pincers, viz. pincers 28 which were open, close grasping an empty bobbin 37 coming out of the loader, while pincers 29 which are closed, open allowing the full bobbin 35 to drop into the unloader (FIG. 3).

As soon as this movement has been made, a pushbutton appertaining to the automatism starts the next cycle which is identical to the preceding one except for the fact that this time pincers 28 bring an empty bobbin 38 into position in the first spindle 36 in place of a full one previously removed. The cycle will be repeated until the end of the machine where the end of a stroke switch, hitting a suitable contact, will cause the machine to stop.

Referring now to FIGURES 4–8 of the attached drawings, in which only one spindle 101 of the machine is shown, a rail 102 runs along the whole line of spindles as well as a general tubing 103 for compressed air feed required for operation of the device. The compressed air flows through a union 104 from a compressor or other suitable source.

Stop pins 105 are fitted along the rail at intervals equal to the distance between spindle centers while at intervals which may also be equal to the distance between spindle centers or even more according to compressed air requirements, air inlet valves 106 are fitted. These valves are usually closed by a head 107 which is held pressed downwards by a suitable spring 108. It is to be noted that valves 106 are arranged in tubing 103 in such a way as to pick up air at approximately the center of said tubing, thus allowing eventual moisture or impurities to deposit on the bottom of tube 103, consequently supplying good quality air to the whole device, and considerably reducing wear and maintenance.

The feed mechanism of the device according to this invention is composed of a sliding carriage 109 with upper wheels 110 and one or more lower wheels 111 which slide in a second rail 112 fixed to the floor in front of the spinning or doubling machine. The latter rail is capable of guiding wheels 111 in one of the two ways illustrated in lower part of FIG. 6.

During its stroke the device takes in compressed air from the general tubing, by means of two intake valves 113 and 114 of which one, i.e., that indicated by 113 is fixed in respect of carriage 109, while the other, 114, slides in respect of the carriage.

These intake valves 113 and 114 are both complete with a punch 115 and when carriage is in position under a feed valve 106, each punch is pushed upwardly by a respective rod 116 in each of the respective cylinders 117 and 118; they come into contact with feed valve 106; punch 115 enters valve 106 pushing head 107 upwards and overcoming resistance of spring 108.

In this way compressed air enters intake valve 113 or 114 according to which one of the two is operated, passes on to a single direction valve 119 which prevents the air from escaping when the valve is detached. Compressed air reaches a lung or tank acting as storage 120 which, according to its dimensions can suffice for operation of one or more spindles. From lung 120 the compressed air passing through suitable tubes 121 complete with gauge 122, is sent on to the whole device for its operation.

As has been stated, intake valve 113 is fixed in respect of carriage 109 and, consequently, air flows from here to the lung 120 through a rigid pipe 123, while intake valve 114 is sliding, so that while carriage effects a translation it remains engaged with general tubing 103, thus replenishing the lung during translations of carriage 109, while intake valve 113 replenishes lung 120 during pauses.

In order to make this intake valve 114 sliding in respect of carriage 109 it is fitted, by means of sliding rings 124 on a couple of guides 125 which are fixed to the carriage; consequently intake valve 114 sends compressed air to lung 120 through a flexible tube or extendable tube 126; as soon as the carriage stops at a following station and fixed intake valve 113 has inserted itself in a feed valve 106, sliding intake valve 114 detaches itself and moves on the next position being recalled toward carriage 109 by a return spring 127 which stretched while valve 114 was engaged with the feed and the carriage was moving forward.

Positioning of carriage 109 which is made to move forward by the thrust of pneumatic cylinder 128 secured to the carriage 109 (FIG. 6) is effected by means of a jaw 129 which, resting against stop pins 105, compels cylinder 128 to slide relative to rod 141 to carry the carriage and the whole device forward by one position (towards the right in FIGURE 4) until lever 130 hitting the next spindle 101 or coming up against a stop 131 which simulates the spindle, especially in the first two positions of stroke, causes cylinder 128 to stop and, by means of its projection or cam 132, operates valve 133 which causes operation of the whole supporting unit appertaining to the seizing pincers.

When the carriage has completed is stroke along the line of machine spindles, in order to be able to return to its original position at the extreme left of the line, an end of stroke stop (not shown) has been planned. The release lever 134 hits this stop and thus positioning jaw 129 is kept lowered during the whole of its return stroke; release lever 134 acts on angular lever 135 which, by means of its opposite end pulls cable 136 which causes jaw 129 to drop. At the beginning of a stroke, release of jaw 129 is effected by release lever 137 which comes up against a start of stroke point.

During a stroke, release of the jaw is controlled by lever 138 which is also joined to angular lever 135 and is made to move by projection 139 fitted on feed pneumatic cylinder unit 128. The above-mentioned jaw 129 is supported by a support lever 140 that is guided by a rod 141 and returned to its position following each release effected by cable 138, by a return spring 141'.

A unit comprising the pincers which grasp the bobbins is fitted on a movable support 142 which can slide along columns 143 fitted on carriage 109, guided by a pneumatic driving cylinder 144. Aforesaid movable support carries a rotation shaft 145 appertaining to the grasping hands unit.

Figure 7:
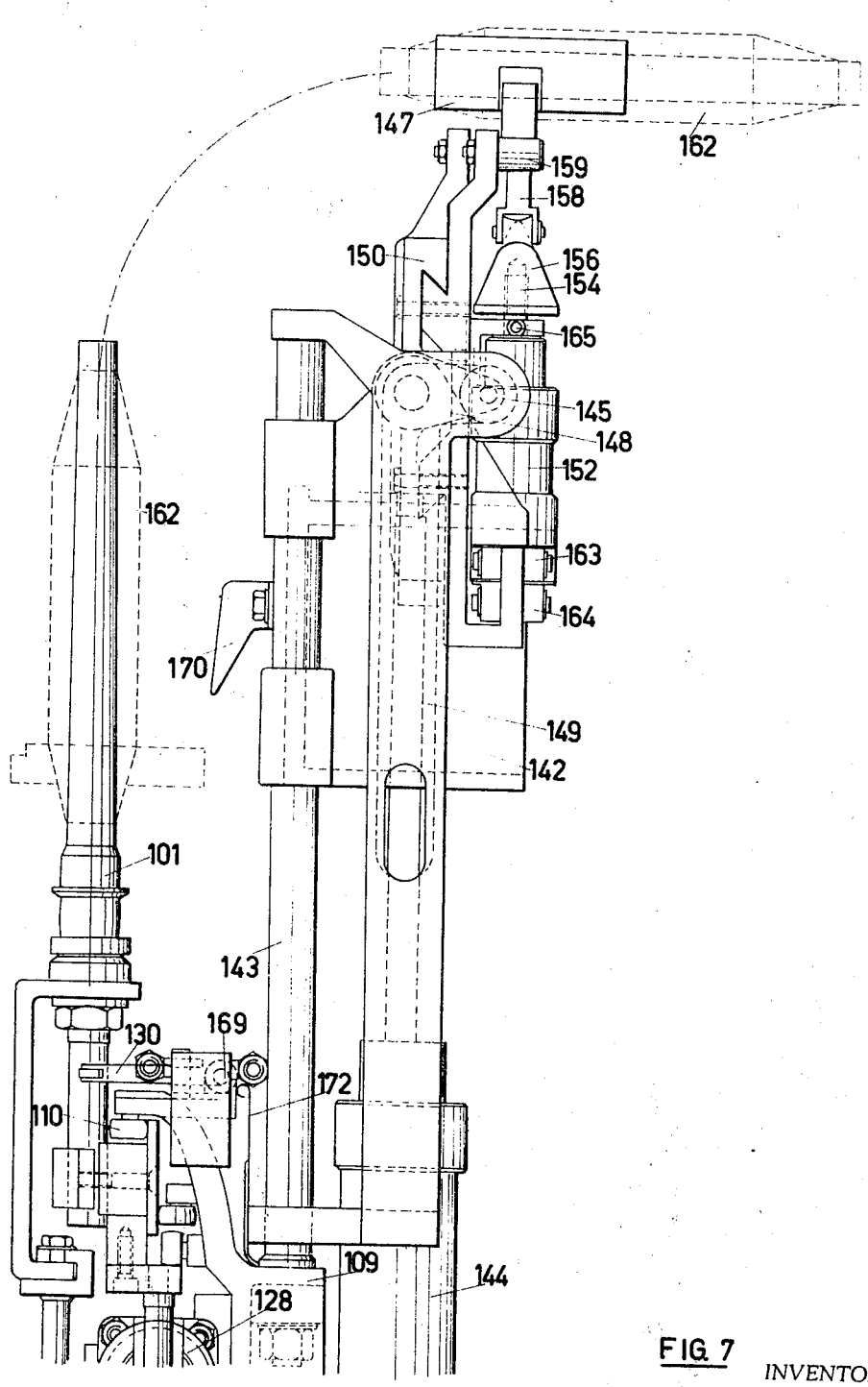
FIG. 7 is a side view of the same upper part of the device, illustrated in FIG. 5, but on a slightly smaller scale.
Figure 8:
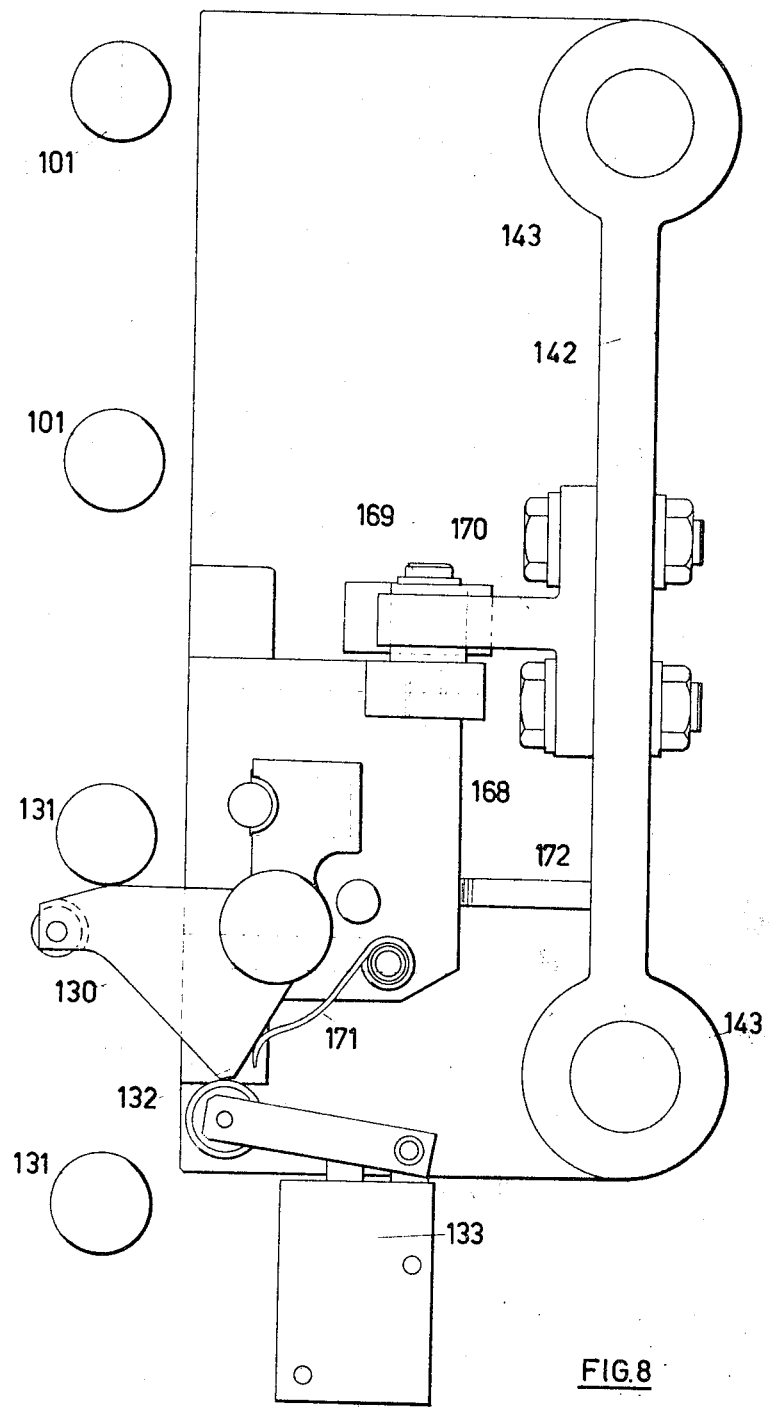
FIG. 8 is a top view on a still larger scale, of the special carriage which places the device of the second embodiment in position along a spinning or doubling machine.

As already stated, the grasping hands are two, i.e., the lefthand one 146, composed of two pincers which inserts the empty bobbin in the spindles for subsequent operation, while the righthand hand 147 which is also composed of two pincers removes bobbins full of spun or twisted yarn. Rotation of hands 146 and 147 around shaft 145 and their lowering onto the spindles is controlled by lever 148 which is made to slide in the cam or angular race 149 solid with movable support 142. The race 149 is formed in an inverted L-shape with a vertical portion and a generally horizontal portion (FIG. 7). Upon upward movement of the support 142, the rotation shaft 145 is guided along the vertical portion of the race 149; however, after reaching the junction of the vertical and horizontal portions of the race, the rotation shaft 145 is guided along the horizontal portion. When the rotation shaft moves into the horizontal portion, the lever 149 begins to rotate in a clockwise fashion as viewed in FIG. 7 to cause similar rotation of the hands 146, 147.

Hands 146 and 147 rest on a support 150 and hand operational parts are also fitted thereto; hand parts comprise two pneumatic cylinders, respectively 151 for hand 146 and 152 for hand 147, synchronized in such a way that hand 146 opens when hand 147 closes and vice versa.

Figure 5:
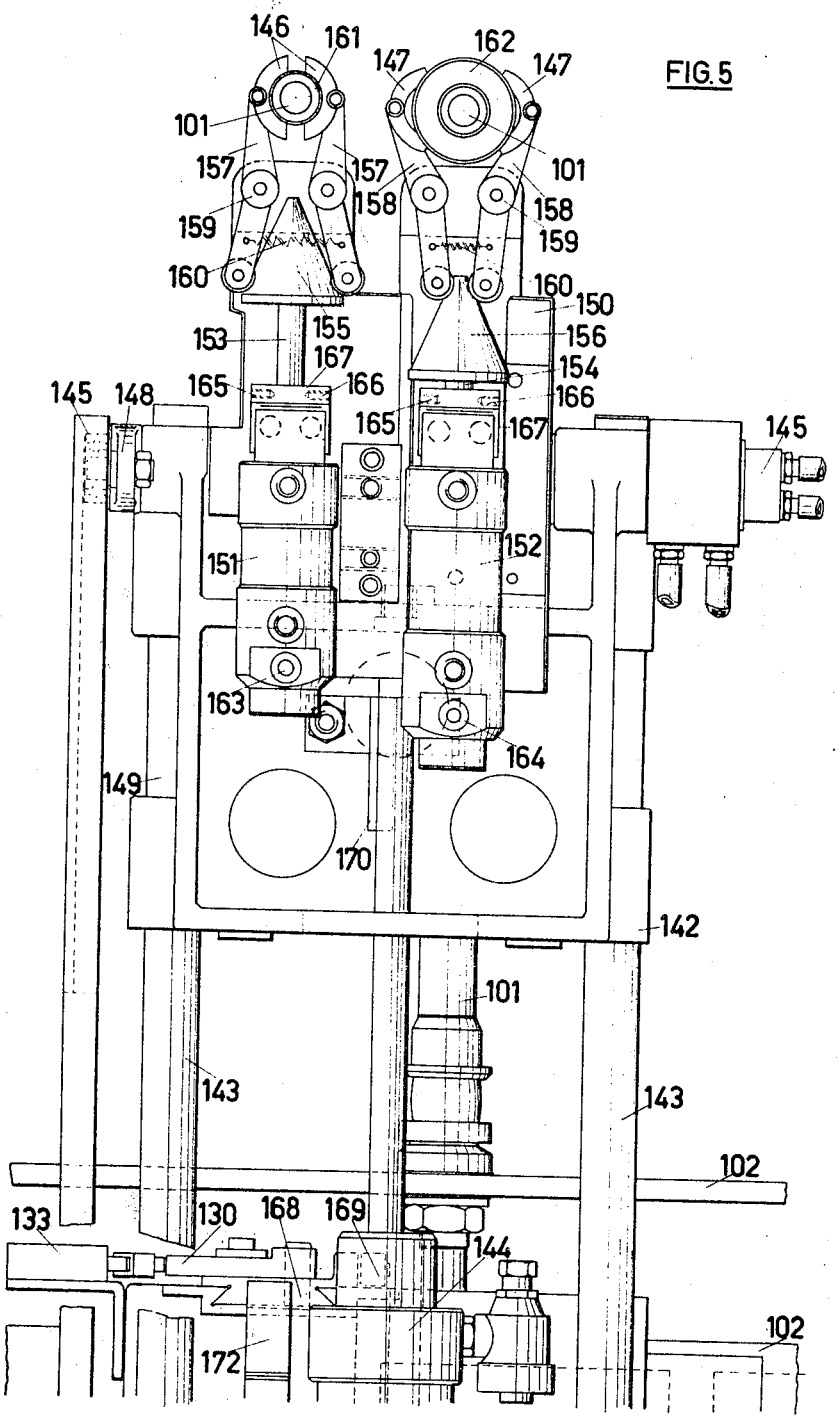
FIG. 5 is a front view on a slightly enlarged scale of the upper part of second embodiment, comprising raising components and the parts relating to rotation and seizing of the bobbins.
Figure 6:
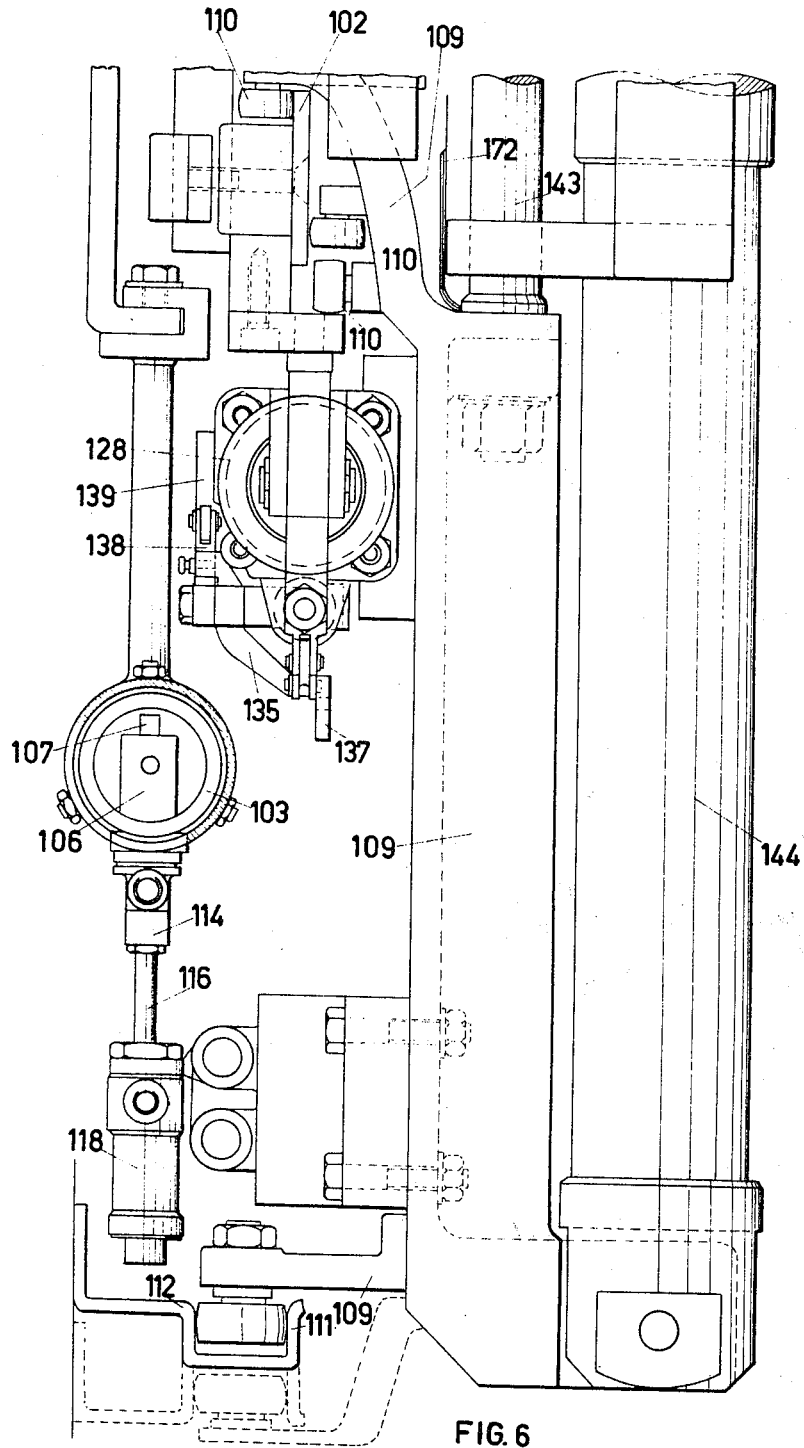
FIG. 6 is a side view of lower part of the device illustrated in FIG. 4 on a slightly enlarged scale.

Rods 153 and 154 belonging, respectively, to cylinders 151 and 152 carry cones 155 and 156 at their ends; said cones insert themselves between hand carrying levers 157 and 158 which are articulated on pivots 159, overcoming resistance of return springs 160, thus causing opening and closing of a hand according to the shape and fullness of a bobbin; in FIG. 5 an empty bobbin 161 is shown while grasped by hand 146 while a full bobbin 162 is held by hand 147; this full bobbin is also shown while it is being grasped, in FIG. 7.

Pneumatic cylinders 151 and 152 are pivoted on pins 163 and 164 and, by means of adjustment screws 165 and 166 planned in a small support 167, it is possible to center and adjust with precision the hands in respect to a spindle, presetting space between centers of spindles from one machine to another as well as the grasping distance of the pincers according to shape and size of bobbins.

It was stated earlier that the device was stopped in front of each spindle on account of a stop lever hitting spindle 101 or other stops 131. This stop lever 130, together with its projection 132, is fitted on a positioning carriage 168 which, in its turn, is fitted on main carriage 109. Positioning carriage 168 is pivoted on a rotating pin 169 and can be pressed by a cam 170 which slides on columns 143 and is solid with movable support 142.

Consequently, when movable support 142 reaches its lowest position, cam 170 causes positioning carriage 168 to rotate downwards round pin 169 and, overcoming the resistance of spring 171, it pushes stop lever 130 till it passes over stop 131 or spindle 101. When the movable support returns upwards and cam 170 releases pin 169, a suitable spring 172 causes positioner carriage 168 to rise again bringing it back towards the line of spindles so as to preset the stop at the next spindle.

The detailed description given makes operation of the second embodiment of the device according to the invention quite clear; however a brief explanation will now be given so as to describe the sequence of the several movements.

Operation is started as preferred, viz. by hand, mechanically or electrically, etc. At the beginning of a stroke air intake piston 118 is already inserted together with its sliding valve 114 in the first feed valve 106; pneumatic feed cylinder causes carriage 109 and the whole device to move to the right until the device meets the first stop 131 and causes carriage 109 to stop. At the same time valve 133 operates pneumatic cylinder 144 which acts on movable support 142 causing it to drop and the movement is inverted between pneumatic cylinder 118 and 117 so that fixed air intake valve 113 from the position under second feed valve 106' has moved during forward movement of carriage 109 to under the third feed valve 106'' inserting itself therein, while sliding air intake valve 114, after leaving the first feed valve 106 is called back by return spring 127 whereupon it places itself under the second feed valve 106' remaining, however, detached therefrom.

Lowering of the movable support causes, by means of sliding of control lever 148 in a cam or angular race, rotation of hands 146 and 147 from a position perpendicular to the spindles' axis as shown in FIG. 5, to a coaxial position on the spindles and their drop onto said spindles. During this lowering of movable support 142, projection 139 causes lever 138, angular lever 135, cable 136 and positioning jaw 129 to release. The jaw is drawn by the pneumatic cylinder rod and is positioned at the next stop pin 105 on rail 102 so as to prepare the carriage for the next translation.

Righthand hand 147 is now open on the first full bobbin 162 while lefthand 146 firmly grasps a first empty bobbin 161. On reaching the lower end of movable support 142 stroke, control is reversed on pneumatic cylinders 151 and 152, so that righthand hand 147 closes and grasps full bobbin 162 (which might be only half full or empty); this is of no importance because the hand is adjusted to grasp it always, thanks to its double joints, while lefthand hand 146 releases empty bobbin 161 which, for the first time, drops uselessly as there is no spindle. Consequently, it is removed by a conveyor or box (not shown) while, in subsequent cycles, the empty bobbin will insert itself in spindles 101 from which was removed during the preceding cycle of righthand hand 147, the full bobbin of former operation.

At the same time, on reaching the lower end point, cam 170 which projects from movable support 142 causes positioning carriage 168 to drop and releases stop device 131.

At this point, movable support 142 starts moving upwards until, at the upper end of the stroke the hands have effected a complete inverted rotation and cylinders 151 and 152 are inverted so that righthand hand 147 opens and allows full bobbin 162 to drop into a suitable container, while lefthand hand grasps a fresh bobbin 161 which a suitable feed unit (not shown) has promptly placed between the pincers of the aforesaid hand. At the same time, feed cylinder 128 causes the whole to move on to the next station and so on for the whole line of spinning or doubling machine.

It is noted that the various pneumatic cylinders of the embodiment of FIGS. 4 to 8 are connected to the lung 120 through tubes 121 in any suitable manner for operation of the pneumatic cylinders in the manner of the invention. For example, in FIG. 4, the right end of cylinder 128 is adapted for communication with the lung 120.

It is obvious that by means of slight modifications, the device can be fixed on either the spinning or the doubling machine, arranging to have the same number of arms as there are spindles in order to speed up machine operation.

It should be borne in mind that the device according to the present invention could have all translation or linear features, thus eliminating rotation movements of arms fitted with pincers.

The embodiments described and shown in the attached drawings are that of a device with rotating arms so as to avoid the obstacle of the draft wheel which is, at present, fitted on all spinning and doubling machines.

We claim:

1. A device for loading and unloading bobbins on the spindles of spinning and doubling machines comprising
   a carriage for sliding along a row of spindles,
   a pair of pincers mounted on said carriage for engaging bobbins,
   first means for rotating said pincers in a vertical plane about a horizontal axis, and
   second means for moving said pincers in a vertical path.

2. A device as set forth in claim 1 wherein said carriage has a pair of vertically disposed columns thereon, and said second means includes a support slidably mounted on said columns.

3. A device as set forth in claim 2 wherein said second means further includes means secured to said carriage for reciprocally moving said support on said columns to raise and lower said pincers.

4. A device as set forth in claim 2 wherein said means for reciprocally moving said support is adjustable to limit the stroke of said support.

5. A device as set forth in claim 2 wherein said first means includes a pair of cylinders mounted on said support, a pair of pistons respectively mounted in each of said cylinders for reciprocal movement therein, a toothed wheel rotatably mounted in said support on said horizontal axis, a chain secured to each piston and overlying said toothed wheel in meshing engagement therewith, and means for securing said pincers to said toothed wheel whereby upon movement of said pistons in opposite directions said chain rotates said toothed wheel to cause rotation of said pincers about said horizontal axis.

6. A device as set forth in claim 5 wherein said pincers are rotatable through an angle of 180°.

7. A device as set forth in claim 5 wherein said pincers are moved in synchronism.

8. A device as set forth in claim 5 wherein said support moves in synchronism with said pincers whereby said support is moved vertically during rotation of said pincers.

9. A device as set forth in claim 1 further comprising a mechanism for moving said pincers relative to each other to vary the spacing therebetween.

10. A device as set forth in claim 1 wherein each said pincer is independently articulated for complete jointing.

11. A device as set forth in claim 1 wherein each said pincer has a pair of jointed arms and wherein said device further comprises a pair of cones positioned respectively between a pair of jointed arms of each said piston, and means for moving said cones relative to a pair of jointed arms to move said arms relative to each other.

12. A device as set forth in claim 11 wherein said cones are moved in opposite directions to open one pair of jointed arms while simultaneously closing the other pair of jointed arms.

13. A device as set forth in claim 11 wherein each said pincer further includes a return spring for urging said pair of jointed arms together.

14. A device as set forth in claim 11 further comprising means to vary the spacing between said pincers.

15. In combination with a spinning machine having a row of spindles thereon, and a rail disposed in parallel alignment with said spindles; a device for loading and unloading bobbins on said spindles including a carriage slidably mounted on said rail, first means for moving said carriage along said rail in a series of steps, a pair of pincers mounted on said carriage above said rail for engaging bobbins, second means for rotating said pincers in a vertical plane about a horizontal axis above said rail, and third means for moving said pincers in a vertical path substantially parallel to said spindles.

16. The combination as set forth in claim 15 further comprising a plurality of microcontacts on said carriage and rail for actuating said second and third means.

17. The combination as set forth in claim 15 wherein said first means includes a cylinder secured to said carriage, a reciprocally mounted piston in said cylinder, a plurality of housings positioned on said rail relative to said spindles, and rod means on said plunger for sequentially engaging said housings whereby upon engagement of said rod means and one of said housings said cylinder is movable with respect to said plunger to move said carriage along said rail.

18. The combination as set forth in claim 15 wherein said first means includes a cylinder secured to said carriage, a reciprocally mounted rod in said cylinder, a plurality of stop pins positioned on said rail relative to said spindles, and jaw means on said rod for sequentially engaging said stop pins whereby upon engagement of said jaw means with one of said stop pins said cylinder is movable with respect to said rod to move said carriage along said rail.

19. The combination as set forth in claim 18 further comprising a set of levers on said carriage for moving said jaw means out of engagement with said stop pins, said set of levers being actuated upon reaching one end of said rail for permitting return of said carriage to the opposite end of said rail.

20. The combination as set forth in claim 19 further comprising lever means for returning said jaw means into engagement with a stop pin at said opposite end of said rail.

21. The combination as set forth in claim 18 further comprising a tube parallel to said rail for conducting compressed air, a plurality of stations in said tube at fixed intervals, each said station having at least one inlet valve, said carriage having a first intake valve fixed thereon for communication with said inlet valve, and a tank in communication with said intake valve for storing air from said tube.

22. The combination as set forth in claim 21 wherein said carriage further includes a second intake valve slidably mounted on said carriage in communication with said tank for communicating with an inlet valve in said tube, said first intake valve taking in air when said carriage is stationary and said second intake valve taking in air when said carriage is moving.

23. The combination as set forth in claim 22 wherein said first and second intake valves act in alternate synchronism.

24. The combination as set forth in claim 18 further comprising a positioning carriage pivotally mounted on said carriage, a stop lever mounted on said positioning carriage for abutting each of said spindles to arrest movement of said carriage, and a cam on said third means for rotating said positioning to move said stop lever out of abutment with a spindle upon movement of said pincers to a lowermost position whereby said carriage is free to move along said rail upon doffing of the bobbins on a pair of said spindles.

25. The combination as set forth in claim 24 further comprising a spring on said carriage for rotating said positioning carriage in opposition to said cam.

References Cited

UNITED STATES PATENTS 3,300,958  1/1967  Roller et al. _____ 57—53

FOREIGN PATENTS 9,561  10/1906  Great Britain.

DONALD E. WATKINS, *Primary Examiner.*